June 28, 1932.  H. C. HARRISON  1,865,005
POWER TRANSMITTING MECHANISM
Original Filed May 26, 1926

INVENTOR
H. C. HARRISON
BY
G. H. Heydt
ATTORNEY

Patented June 28, 1932

1,865,005

UNITED STATES PATENT OFFICE

HENRY C. HARRISON, OF PORT WASHINGTON, NEW YORK, ASSIGNOR TO WESTERN ELECTRIC COMPANY, INCORPORATED, OF NEW YORK, N. Y., A CORPORATION OF NEW YORK

POWER TRANSMITTING MECHANISM

Original application filed May 26, 1926, Serial No. 111,707, and in Germany December 18, 1926. Divided and this application filed January 28, 1929. Serial No. 335,609.

This invention relates to power transmitting mechanism.

The present application is a divison of application, Serial No. 111,707, filed May 26, 1926.

An object of this invention is to provide a power transmitting mechanism in which the normal manufacturing inaccuracies in the gears are prevented from affecting the angular constancy of rotation of the load.

A further object of this invention is to provide a power transmitting mechanism in which vibration of the moving parts is to a considerable extent absorbed, and in which the generation and transmission of low frequency vibrations is substantially eliminated.

According to the present invention, a mechanism for transmitting power with constancy of angular rotation while substantially suppressing the generation or transmission of undesirable vibrations, comprises a multi-layer worm gear having its respective layers connected to a shaft by means of springs, said springs being provided with means for damping vibrations therein.

The invention is shown applied as a driving arrangement for a phonograph turntable but is, of course, applicable to a variety of uses.

In this particular application, the problem is to drive a shaft, carrying a phonograph turntable from a driven shaft by means of a gear connection. This gear connection must be of such nature as to give constancy of angular rotation and to eliminate insofar as possible all mechanical vibration. In the present case, the gears used are a worm wheel of unusual construction driven by a worm.

It is well known that, after a gear train has been run for a time, irregularities in the gears will be worn down till there is an apparent smoothness of operation. In the case of a worm-gear train with the worm running at constant sped after the gears are run in, an apparently uniform peripheral speed of the worm wheel will be obtained. However, if there were originally any irregularity in the gears, as there usually will be in spite of careful manufacture, then this constant peripheral speed will not give a constant angular rotation since the constant peripheral speed is being applied to a surface having a varying radius of curvature.

Having broadly outlined above some of the general features of the invention, a better understanding of a typical embodiment will be had from the following detailed description in connection with the accompanying drawing. Referring to the drawing.

Figure 1:
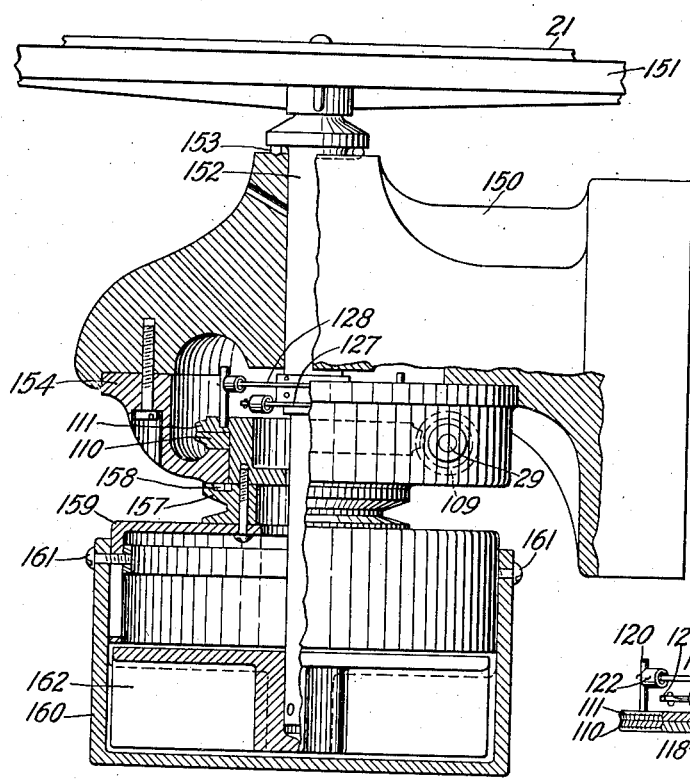
Fig. 1 shows an elevation of the mechanism, partly in section.

The mechanism is supported by a casting 150 which in turn is supported by a suitable pedestal or base (not shown). A turntable 151 upon which a record 21 may be placed is mounted on the vertical shaft 152. The downward thrust of this shaft is taken by a set of ball bearings 153. At the lower end of the casting 150 is located a housing 154 for enclosing the driving worm 109 and novel worm gear 110 and 111. The worm 109 is mounted on a driving shaft 29, suitably journaled in the housing 154, and engages the worm gear layers 110 and 111.

For the sake of simplifying the disclosure the worm gear has been illustrated as consisting of two layers only, though it is obvious that more than two layers may be used. The lower layer 110 of the worm gear is a simple ring and is concentrically supported by a bearing in the lower end of the housing 154. The upper layer 111 of the gear bears on the upper surface of the layer 110 and is integral with a cup-shaped member which holds layer 110 in operative relation with layer 111 and retains the gear as a whole against lateral movement. A collar 157 is secured to the upper layer 111 of the worm gear to prevent longitudinal movement of the gear and is provided with a bearing surface against the bottom of the housing 154, and a washer 158 of suitable material to prevent any appreciable leakage of lubricant from the housing 154. The collar 157 may be formed as a pulley and used as a belt pulley to supply power for moving the recorder or reproducer arm (not shown) across the record 21.

The connection between the worm gear layers 110 and 111 and the shaft 152 is made in a manner which will be clear from the description hereinafter given of Figs. 3 and 4.

A fluid damping device is attached to the upper layer 111 of the worm gear below the collar 157. The exterior of this device consists of an upper cylindrical member 159 partially enclosed by the lower cylindrical member 160. The lower member 160 is adjustably attached to the upper member 159 by means of bolts 161. These two members are thus held together and to the collar 157 so that they all rotate in unison with the worm gear.

Figure 2:
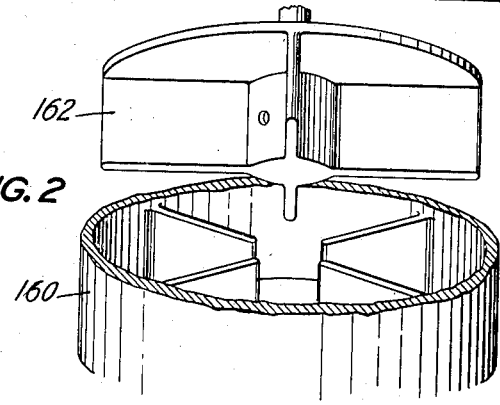
Fig. 2 shows a fluid damping device.

The vertical shaft 152 which supports the turntable 151, is provided at its lower end with a member 162 comprising a device carrying a number of radial vanes which fit closely within the lower member 160 of the damping device, but are not attached thereto. Member 160 is provided with a number of internal radial vanes as is clearly shown in Fig. 2. Preferably these members will have equal numbers of vanes and as shown in the present embodiment, there are four vanes on the member 162 and four vanes on the member 160. The radial vanes of each member are symmetrically located and are symmetrically positioned with respect to each other, and so machined as to allow a small clearance. The chamber formed by members 159 and 160 is filled with some suitable fluid such as oil to above the top of member 162. When a small angular displacement takes place between members 160 and 162, the fluid is forced through the clearance passages from one section to another between the vanes and thus the desired damping is obtained. By lowering or raising the member 160 the clearance between the vanes and the case is increased or decreased thus varying the damping till the desired effect is obtained.

By this arrangement, the damping device places no frictional drag on the shaft 152. When the angular speed of the worm gear is constant, the damping device is entirely inactive; but upon any sudden increase or decrease in rotation, the damping device immediately becomes effective.

Figure 4:
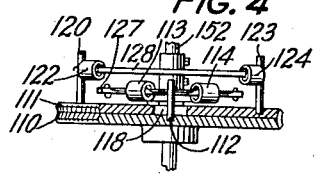
Fig. 4 is a view, partly in section, of the multi-layer worm gear and the spring connection to the driven shaft.
Figure 3:
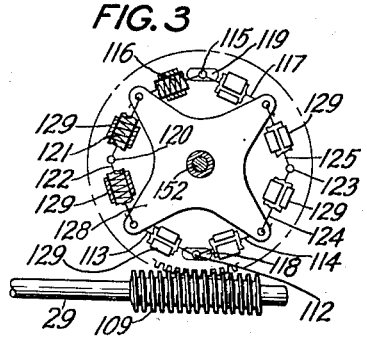
Fig. 3 shows the worm gear train connecting the driving and driven shafts.

In Figs. 3 and 4 are shown side and edge views, partly in section, of the novel multi-layer worm gear. This worm gear has been devised to compensate for the irregularities inherent in a worm gear of commercial manufacture and thereby approach the action of a perfectly formed worm gear. Its design is such that the amplitude of the angular speed variation is decreased and the frequency of the vibrations set up during operation is increased. By decreasing the amplitude and increasing the frequency of such disturbances they may be more readily eliminated by filtering methods such as are described in the parent specification.

The worm gear consists of two or more thin discs or layers which are clamped together and cut simultaneously in the usual manner. The layers are then reassembled in an angular relation other than that occupied during the cutting operation. The variations in cut have been found to be cyclic and the best practical displacement of each layer is a progressive displacement equal to 360° divided by the number of layers. Thus, if two layers are used to make up the gear, after cutting the layers will be placed so that corresponding points will be 180° apart. If three layers are used, the spacing of the originally corresponding points will be 120° apart between successive layers, while if four layers are used the layers are shifted 90° apart. Thus the high spots of one layer will be more or less in alignment with low spots on the other layers thus producing a composite gear which on the average will operate more nearly perfectly than a single piece worm gear of normal accuracy of manufacture.

The superimposed layers are free to rotate slightly with regard to each other and are individually and elastically coupled to the driven shaft. The composite gear is driven as a whole by a common worm. The action of this multi-layer worm gear is to average out the angular errors in the driving faces of the layers and also to reduce any clamping action on the threads of the worm.

The worm gear shown is made up of two layers 110 and 111. The lower layer 110 of the gear has secured thereto two pins 112 and 115 passing through slots 118 and 119 in the upper layer 111. These slots will allow a relative angular movement of the layers. The upper end of pin 112 is connected to springs 113 and 114; the upper end of pin 115 is connected to springs 116 and 117; the free ends of the springs are connected to a star-shaped member 127 which is rigidly secured to the shaft 152. Similarly the upper layer 111 of the gear carries two pins 120 and 123 which are connected by means of springs 121, 122, 124 and 125 to a star-shaped member 128 rigidly secured to the shaft 152. To provide damping for the spring elasticities, a wrapping 129 of felt or similar material enclosed by a slitted thin elastic tube may be employed. The slitted tube prevents the felt from stretching with the spring and holds the damping material in position. The use of damping with helical springs makes possible the use of very light springs with a corresponding gain in the efficiency of suppression of vibrations.

It is obvious that this gear arrangement not only provides an elastic coupling between the driving shaft 129 and the driven shaft 152, but that by displacing the layers after cutting any irregularities are averaged so as to produce a rotation of the driven shaft which is more uniform than would otherwise be obtained unless the gears were perfectly cut. The relative angular movement between the layers, with the individual yielding connection to the driven shaft allows irregularities to adjust themselves when passing the worm much more smoothly than would otherwise be possible. The combination of the fluid damping means on the shaft, the damping on the springs and the relative freedom of the shaft due to the elastic connection will largely prevent the generation or transmission of vibrations.

What is claimed is:

1. A gear wheel comprising a plurality of coaxial discs progressively and equally displaced around the circumference of the gear from the positions assumed during the cutting of the gear.

2. A gear wheel comprising a plurality of superimposed coaxial discs equiangularly displaced from the positions assumed during cutting and individually and resiliently connected to the driven shaft.

In witness whereof, I hereunto subscribe my name this 25th day of January, 1929.

HENRY C. HARRISON.